United States Patent
Oukassi et al.

(10) Patent No.: US 9,356,313 B2
(45) Date of Patent: May 31, 2016

(54) SOLID ELECTROLYTE FOR LITHIUM BATTERY, COMPRISING AT LEAST ONE ZONE OF LITHIUM-CONTAINING GLASS CERAMIC MATERIAL AND METHOD OF PRODUCTION

(75) Inventors: Sami Oukassi, Saint-Egreve (FR); Samir Guerroudj, Saint-Etienne (FR); Michaël Roffat, Chateauroux (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 393 days.

(21) Appl. No.: 14/117,238
(22) PCT Filed: Jun. 15, 2012
(86) PCT No.: PCT/FR2012/000246
§ 371 (c)(1),
(2), (4) Date: Nov. 12, 2013
(87) PCT Pub. No.: WO2012/172197
PCT Pub. Date: Dec. 20, 2012

(65) Prior Publication Data
US 2014/0248541 A1 Sep. 4, 2014

(30) Foreign Application Priority Data
Jun. 16, 2011 (FR) ...................... 11 01849

(51) Int. Cl.
H01M 10/0562 (2010.01)
H01M 10/052 (2010.01)
H01M 6/18 (2006.01)
H01M 6/40 (2006.01)

(52) U.S. Cl.
CPC ............ *H01M 10/052* (2013.01); *H01M 6/185* (2013.01); *H01M 6/187* (2013.01);
(Continued)

(58) Field of Classification Search
CPC ............ H01M 6/185; H01M 10/0562; H01M 2300/0071
USPC .......................................................... 429/322
See application file for complete search history.

(56) References Cited

U.S. PATENT DOCUMENTS
5,702,995 A 12/1997 Fu
2007/0087230 A1 4/2007 Jenson et al.
(Continued)

FOREIGN PATENT DOCUMENTS
EP 2 270 904 A2 1/2011

OTHER PUBLICATIONS

Nagamine et al. Lithium ion conductive glass-ceramics with $Li_3Fe_2(PO_4)_3$ and YAG laser-induced local crystallization in lithium iron phosphate glasses. Solid State Ionics, vol. 179, 2008, pp. 508-515 [online], [retrieved on Feb. 2, 2016]. Retrieved from the Internet <URL: http://www.sciencedirect.com/science/article/pii/S0167273808002981>.*

(Continued)

*Primary Examiner* — Basia Ridley
*Assistant Examiner* — James Erwin
(74) *Attorney, Agent, or Firm* — Oliff PLC

(57) ABSTRACT

At least one zone made of lithium-containing glass-ceramic material, in a solid electrolyte for a lithium battery, is formed from a lithium-containing ceramic material, advantageously in the form of a layer such as a thin film. It is obtained by melting of at least a part of the lithium-containing ceramic material, followed by a recrystallization heat treatment. Melting is obtained by a laser beam irradiation operation, which enables fabrication of the solid electrolyte to be performed directly on a multilayer stack comprising certain active components of the lithium battery.

13 Claims, 4 Drawing Sheets

(52) U.S. Cl.
 CPC .......... *H01M 6/40* (2013.01); *H01M 10/0562* (2013.01); *H01M 2300/0071* (2013.01); *H01M 2300/0094* (2013.01)

(56) References Cited

U.S. PATENT DOCUMENTS

2008/0268346 A1  10/2008  Inda

2009/0065042 A1  3/2009  Reynolds

OTHER PUBLICATIONS

Higashi et al. Pulsed-Laser-Induced Microcrystallization and Amorphization of Silicon Thin Films. Jpn. J. Appl. Phys. vol. 40, 2001, pp. 480-485 [online], [retrieved on Feb. 2, 2016]. Retrieved from the Internet <URL: http://iopscience.iop.org/article/10.1143/JJAP.40.480/pdf>.*

\* cited by examiner

SOLID ELECTROLYTE FOR LITHIUM BATTERY, COMPRISING AT LEAST ONE ZONE OF LITHIUM-CONTAINING GLASS CERAMIC MATERIAL AND METHOD OF PRODUCTION

BACKGROUND OF THE INVENTION

The invention relates to a solid electrolyte for a lithium battery and in particular for an "all-solid state" lithium microbattery, comprising at least one zone made from lithiated glass-ceramic material and to a method for producing a solid electrolyte for a lithium battery comprising at least one zone made of lithiated glass-ceramic material.

STATE OF THE ART

Lithium microbatteries are lithium batteries formed by the techniques used in the microelectronics field. They are in the form of solid thin films, generally made from inorganic materials. They are also called "all-solid state" lithium batteries or microbatteries in so far as all their constituents, even the electrolyte, are in solid form.

Among their constituents, particular interest has to be paid to the choice of the solid electrolyte. The latter not only has to present a good ionic conductivity, but also be a very good electronic insulator. In addition, it is necessary to obtain a solid electrolyte that is as thin as possible. The thickness of the solid electrolyte is in fact a determinant factor for the final performances of the lithium microbatteries.

Among known inorganic materials to be used in solid electrolytes for lithium microbatteries, certain ceramic materials of NASICON type can be cited, in particular lithiated materials complying with the formula $Li_{1+x}M_xN_{2-x}(PO_4)_3$, with M=Al, Ga, Cr, Sc, . . . and N=Ti, Ge, Hf, . . . or with the formula $Li_{1+x+y}M_xN_{2-x}Q_yP_{3-y}O_{12}$, with in addition Q=Si, Se . . . . These materials do however present the drawback of being difficult to shape, in particular in the form of thin films.

It has been proposed in the past to transform these materials into glass-ceramic form, i.e. a vitreous phase (or amorphous phase) in which a crystal phase, generally in the form of micro-crystals, is dispersed. It has in fact been found that this transformation enables the resistivity of the ceramic material grain boundaries to be decreased and thereby increasing the total ionic conductivity to lithium ions at ambient temperature. Furthermore, lithiated glass-ceramic materials are easier to implement than their ceramic counterparts.

In Patent U.S. Pat. No. 5,702,995, it is for example proposed to form a lithiated glass-ceramic material, with a crystal phase of $Li_{1+x}Al_xTi_{2-x}(PO_4)_3$ type. This is achieved by forming a glass containing the ingredients necessary for formation of the crystal phase, by melting and solidification, and in then forming said crystal phase in the vitreous matrix by heat treatment. A lithiated glass-ceramic material having a crystal phase of $Li_{1+x}Al_xTi_{2-x}(PO_4)_3$ type is thereby more particularly produced by mixing the precursor materials necessary for producing this material and by heating it to its melting point, in an electric furnace (with a temperature typically up to 1450° C.) for 1.5 hours. After the molten material has been cast on a support to form a uniform plate (or strip) in vitreous phase, the plate is subjected to additional annealing at 550° C., for 2 hours, to eliminate thermal stresses. Then the samples obtained from this plate are subjected to recrystallization heat treatment enabling the glass-ceramic material to be obtained. It was found that the glass-ceramic material obtained after recrystallization heat treatment at 1000° C., for 12 hours, presented a $Li^+$ ionic conductivity of $1.0*10^{-3}$ S/cm, at ambient temperature.

In general, the glass-ceramic plates obtained by such a production method cannot be used directly as solid electrolyte in a lithium microbattery in so far as that they are too thick. Furthermore, the thinner the glass-ceramic plates, the more they are fragile, breakable and therefore difficult to handle.

Therefore, to facilitate its implementation, the glass-ceramic material is in general crushed, after it has been synthesized, in powder form and is incorporated in a $Li^+$ ionic conducting polymer. The mixture can then be coated on a support or be cast in the form of a flexible thin layer. US Patent application US2008/0268346 in particular describes a solid electrolyte able to be used in a lithium battery comprising an organic polymer to which an organic or inorganic lithium salt and a $Li^+$ ionic conducting glass-ceramic material powder have been added.

However, incorporation of the glass-ceramic material in powder form in an ionic conducting polymer to lithium ions causes an increase of the electronic conductivity of the solid electrolyte thus formed, which is detrimental to the lifetime of the battery. Furthermore, the solid electrolytes obtained present a thickness comprised between 20 μm and 60 μm. This thickness range, although it is small compared with techniques for producing glass-ceramic material in the form of plates as described in the Patent U.S. Pat. No. 5,702,995, does however remain fairly high in an application field where it is sought to obtain solid electrolytes that are as thin as possible.

OBJECT OF THE INVENTION

The object of the invention is to provide a solid electrolyte for a lithium battery, and in particular for a lithium microbattery, comprising at least one zone made from lithiated glass-ceramic material and remedying the drawbacks of the prior art.

In particular, the object of the invention is to provide a solid electrolyte comprising a zone made of lithiated glass-ceramic material, presenting good performances in the field of lithium batteries while at the same time being easy to shape, in particular in the form of a thin film in order to be able to be integrated in a more general method for forming a lithium microbattery.

This object tends to be achieved by the appended claims.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PREFERRED EMBODIMENTS OF THE INVENTION

At least one zone made of lithiated glass-ceramic material, in a solid electrolyte for a lithium battery and in particular for a "all-solid state" lithium microbattery, is formed from a lithiated ceramic material.

What is meant by solid electrolyte for a lithium battery is an electrolyte in solid form, excluding the presence of a component in liquid form, and suitable for use in a lithium battery, i.e. able to transport or conduct lithium ($Li^+$) ions.

What is meant by lithiated ceramic material is a solid material presenting both metallic elements (in particular lithium) and non-metallic elements. Once synthesized, it is in general in powder form, but can be shaped, notably by sintering. For example purposes, the lithiated ceramic material can be of $Li_{0.5}La_{0.5}TiO_3$ type also referred to by the initials LLTO or of $Li_{1.5}Al_{0.5}Ge_{1.5}(PO_4)_3$ type also referred to by the initials LAGP.

Figure 1:
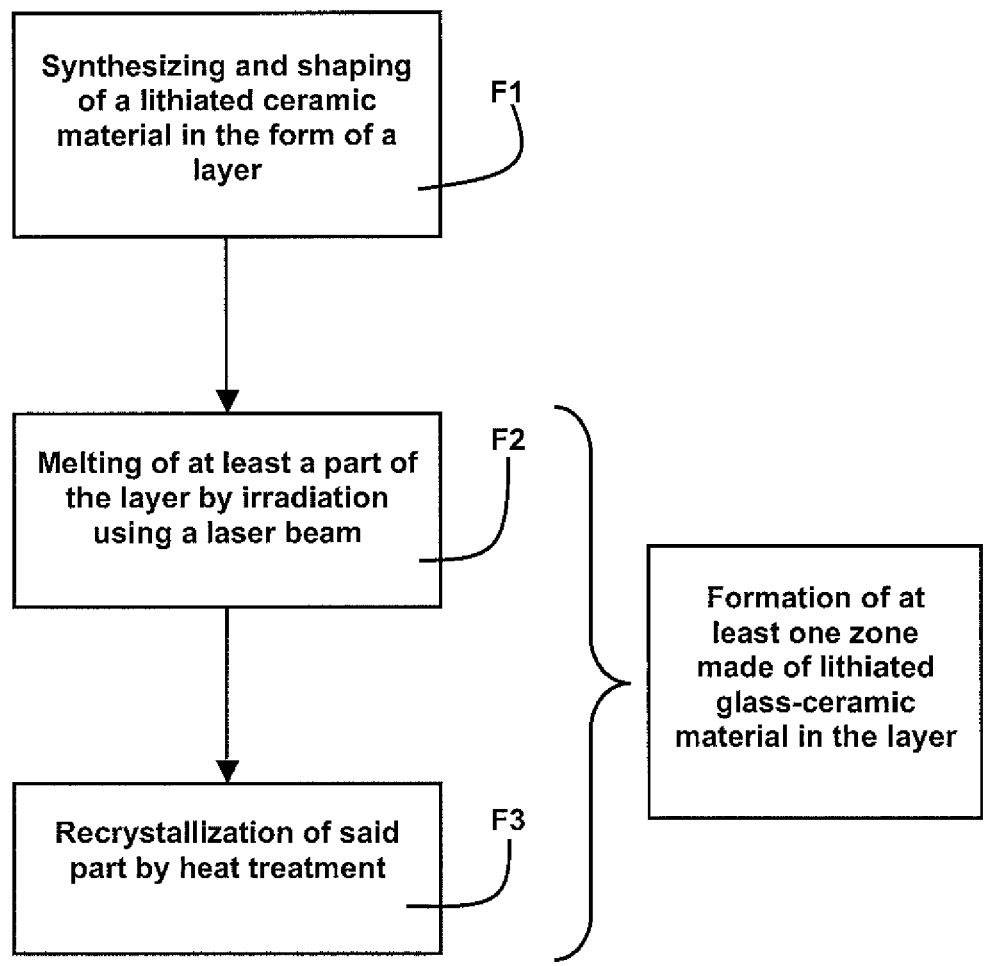
FIG. 1 is a block diagram illustrating different steps of a method for producing a solid electrolyte for a lithium battery according to the invention.

As illustrated by step F1 in FIG. 1, the lithiated ceramic material used for producing the lithiated glass-ceramic material zone is advantageously synthesized and shaped before being transformed into lithiated glass-ceramic material (steps F2 and F3). In addition, the lithiated ceramic material is advantageously cast in the form of a layer to enable subsequent use of this layer or a part of this layer as solid electrolyte for a lithium battery.

The techniques used for synthesis and shaping in the form of a layer vary according to the type of layer required, in particular if it is desired to produce a thin layer or a thick layer and/or a layer that is porous or not. In most cases, it is advantageous to obtain a porous layer with a compactness lower than or equal to 95% and advantageously comprised between 70% and 95% and even more advantageously comprised between 85% and 95%.

For a thick layer, also called form or bulk substrate in the microelectronics field, with a thickness typically greater than 250 μm and advantageously greater than 300 μm, the lithiated ceramic material is synthesized in powder form by techniques conventionally known to the person skilled in the art, and the powder is then cast in the form of a bulk substrate.

For example purposes, the lithiated ceramic material powder can be obtained by mixing the different precursor components useful for producing said material in stoichiometric proportions, followed by several heat treatment, crushing and screening operations. This enables a lithiated ceramic material powder to be obtained. The lithiated ceramic material synthesized in powder form is then shaped. For example, the powder can be pelleted and then pressed in uniaxial and/or isostatic manner. When a porous bulk substrate is to be obtained, a polymer such as polyethylene glycol, vinylidene polyfluoride, or butyral polyvinyl can be added to the powder before pelleting. Then the pellet produced undergoes heat treatment, in general between 850° C. and 1050° C. for a time of up to 24 hours depending on the type of material. To obtain very thick layers (typically with a thickness of 100 to 500 μm), once the lithiated ceramic material has been synthesized, it can be mixed in a slurry composed of solvents, polymers and plasticizers, which is then deposited and shaped to the required thickness on a film, for example made from siliconized polyester. Drying in air then enables evaporation of the solvents to decompose the initial polymers and sintering at around 850-1050° C. Such a method enables very porous layers or strips to be obtained.

In order to obtain a thin layer, also called thin film, with a thickness typically less than or equal to 250 μm and advantageously comprised between 1 and 10 μm, the lithiated ceramic material can for example be synthesized in the form of a powder and applied on a target serving the purpose of performing physical vapor deposition (PVD) on a support. Another method for synthesizing and shaping for layer thicknesses comprised between 10 and 100 μm is a formation technique by sol-gel. This technique enables the porosity of the thin film to be adjusted according to the concentration of the initially prepared solution.

Then, as illustrated by step F2 in FIG. 1, at least a part of the layer is irradiated by laser beam, and in particular by pulsed laser beam, in order to achieve melting of the lithiated ceramic material and to obtain a vitreous phase after solidification. Performing melting of a part of the lithiated ceramic material by a laser beam irradiation step presents numerous advantages. In particular, this enables the part of the material to be melted, designed to form the lithiated glass-ceramic material zone, to be precisely controlled.

The use of a laser beam on lithiated ceramic materials was not obvious for the person skilled in the art. Indeed, although lasers and in particular pulsed lasers are nowadays used industrially for cutting, welding, and marking applications, they are only very seldom used in fields involving lithium. Irradiation by laser beam and in particular by pulsed laser beam does in fact give rise to a very large localized temperature increase, typically between 1000° C. and 1600° C. It is however known that with conventional heat treatment above 1300° C., lithium evaporates in the form of $Li_2O$, which is detrimental for the total ionic conductivity of the material. It was however observed, in the scope of the present invention, that the evaporation of $Li_2O$ is minimal with respect to the quantity of lithium present in the material, which enables the good ionic conductivity properties of the material to be preserved, once the latter has been transformed into lithiated glass-ceramic material.

The choice of the laser beam and of the irradiation method parameters condition the energy input to the lithiated ceramic material. These parameters are in particular the wavelength of the pulsed laser beam, the pulse frequency and fluence of the laser beam, and the atmosphere in which the treatment is performed. Advantageously, the pulsed laser used for performing melting is a laser called nanosecond laser. Furthermore, melting is advantageously performed in a primary vacuum or in an inert gas atmosphere, such as helium or argon.

It is thus possible to control and master melting of the material and the thickness over which the treatment is to be performed. This is advantageous, in particular when the lithiated ceramic material is in the form of a thin film arranged on a support. This enables the solid electrolyte to be able to be made on a support already comprising active elements of the lithium battery without damaging it. This is in particular the case for the current collector and at least one of the electrodes of the microbattery which can therefore have already been formed.

Once the vitreous phase has been obtained, the part of the material that underwent the laser beam irradiation step is at least subjected to recrystallization heat treatment to form the lithiated glass-ceramic material (step F3). Recrystallization by heat treatment is partial: it enables the formation of crystals of lithiated ceramic material in the vitreous phase, which, by definition, forms the lithiated glass-ceramic material. This recrystallization heat treatment can in conventional manner be performed in a furnace at a lower temperature than the melting temperature of the lithiated ceramic material and advantageously comprised between 500° C. and 1000° C., for a time comprised between 1 hour and 72 hours. According to an alternative, it can also be achieved by heat treatment by laser beam irradiation in order in particular to only treat a part of the lithiated ceramic material.

FIGS. 2 to 6 illustrate a particular embodiment of a solid electrolyte for a lithium battery, from a bulk substrate 1 made of lithiated ceramic material.

Substrate 1 was previously synthesized and shaped in conventional manner. The substrate advantageously has a thickness of more than 250 µm. Substrate 1 can be self-supported.

Figure 2:
FIGS. 2 to 6 schematically represent a first particular embodiment of a solid electrolyte for a lithium battery in cross-section.
Figure 3:
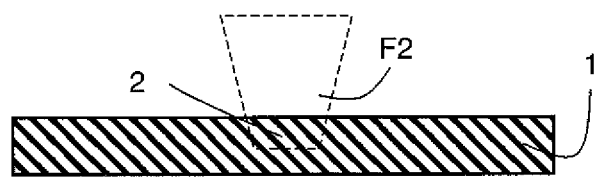

In FIG. 2, bulk substrate 1 is subjected to a laser beam irradiation step. In particular, in this particular embodiment, this laser beam irradiation step is local: only a part 2 of substrate 1 is subjected to laser beam irradiation in FIG. 2. The localized irradiation step is thus represented in schematic manner by a trapezium in broken lines in FIG. 2, the part of the trapezium delineated in substrate 1 corresponding to irradiated part 2 of the substrate. Furthermore, in FIG. 2, this part 2 is formed in the top part of substrate 1, with a thickness that is smaller than the total thickness of substrate 1. Naturally, in alternative embodiments, the laser beam irradiation step could be performed on the whole of substrate 1 or be localized on a part of the substrate over the whole thickness of substrate 1.

Figure 4:

This irradiation operation by laser beam has the effect of causing melting of the lithiated ceramic material in part 2 of substrate 1 and which, once solidified, is formed by a vitreous phase. This vitreous phase is represented in FIG. 4 by reference 3. Substrate 1 in general further presents a certain porosity. The molten lithiated ceramic material in part 2 thus passes through the pores of the substrate, in a zone 4 of substrate 1 that is not irradiated by the laser beam, arranged underneath part 2. The molten material then coats the grains of lithiated ceramic material located in said zone 4. After cooling of the molten material, this zone 4 then presents a different microstructure from the rest of the non-irradiated substrate: it is formed by the grains of the lithiated ceramic material coated by a vitreous phase. This vitreous or amorphous phase is non-conductive to lithium ions.

Figure 5:
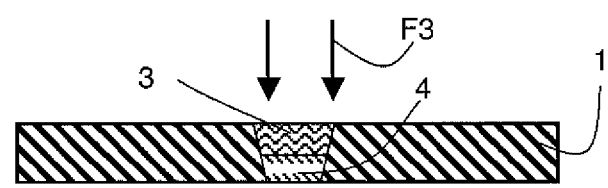
Figure 6:

The recrystallization heat treatment, represented by arrows F3 in FIG. 5, is then performed in order to transform the previously obtained vitreous phase into lithiated glass-ceramic material. It is in particular performed at a lower temperature than the melting temperature of the lithiated ceramic material and therefore at the temperature reached by irradiation with the laser beam. This treatment can, as in FIG. 5, be localized to the part of the substrate formed by part 3 in vitreous phase, possibly with zone 4 located underneath part 3 in vitreous phase. In this case, part 3 of substrate 1 is transformed into lithiated glass-ceramic material and constitutes zone 5 of lithiated glass-ceramic material of the solid electrolyte. The solid electrolyte further comprises an additional zone 6, in contact with zone 5 and constituted by grains of lithiated ceramic material coated with lithiated glass-ceramic material (FIG. 6). The grain boundaries in such a substrate 1 are consequently less resistive than in the initial lithiated ceramic material.

According to an alternative, the recrystallization heat treatment could be performed on the whole of substrate 1 or localized only on part 3 of substrate 1.

FIGS. 7 to 11 illustrate a particular embodiment of a solid electrolyte for a lithium battery, from a thin film 7 made from lithiated ceramic material.

Figure 7:
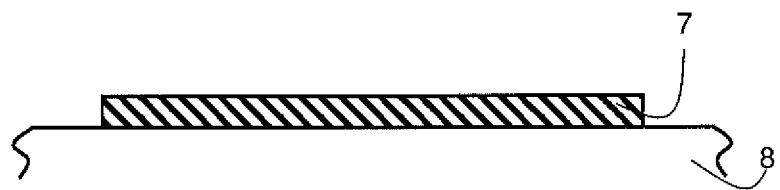
FIGS. 7 to 11 schematically represent a second particular embodiment of a solid electrolyte for a lithium battery in cross-section.

Thin film 7 was previously formed, in FIG. 7, on a support 8 and in general presents a thickness of less than 250 µm. Support 8 is for example made from silicon, glass or metal. It is in advantageous manner formed by a stack of several layers (multilayer stack), themselves previously formed in the scope of a more general fabrication method of a lithium battery and in particular of an all-solid state lithium microbattery. These are notably layers forming at least a one current collector, for example made from platinum, and an electrode suitable for producing a lithium battery such as an electrode of $LiCO_2$, Si, Ge or C type.

Figure 8:
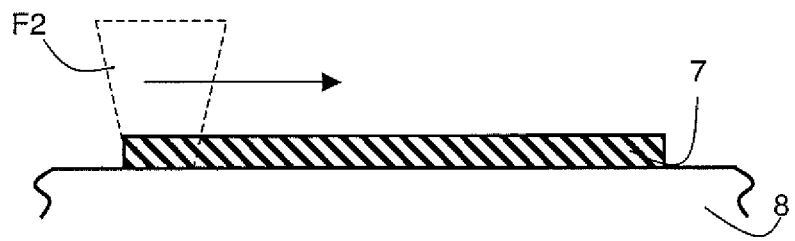
Figure 9:
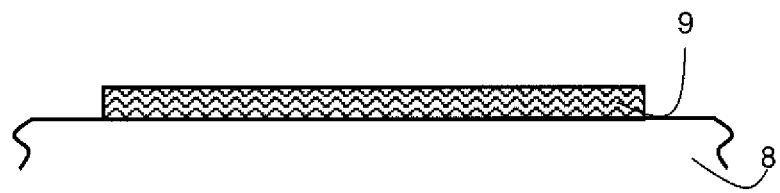
Figure 10:
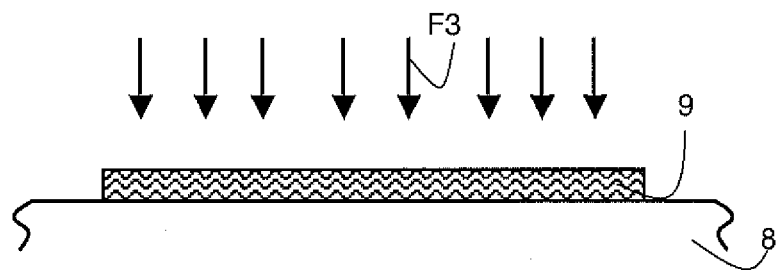

In this particular embodiment, the whole of thin film 7 is advantageously irradiated by the laser beam (trapezium F2 in FIG. 8). The whole of the lithiated ceramic material is thus melted and transformed into vitreous phase 9 after cooling (FIG. 9).

Although the laser beam irradiation is not localized in a part of thin film 7, it does however remain controlled and mastered so as not to disturb the underlying layers in support 7. This laser beam irradiation is thus in particular controlled in order to irradiate thin film 7 over the whole of its thickness, without touching underlying support 8. This is particularly advantageous in a fabrication method of a lithium battery where the solid electrolyte is directly formed on a stack comprising active components of said battery. The active components (in particular current collectors and electrodes) would not in fact be able to withstand heat treatment at the temperatures necessary for melting of the lithiated ceramic material. Performing melting of the lithiated ceramic material by laser beam irradiation thus enables a solid electrolyte with at least one lithiated glass-ceramic material zone to be formed directly on the active components of the lithium battery, from a lithiated ceramic material.

Figure 11:

Once the vitreous phase has been obtained, recrystallization heat treatment is performed (arrows F3 in FIG. 10) to transform the vitreous phase into lithiated glass-ceramic material. In FIG. 11, solid electrolyte 10 obtained is thus formed by the lithiated glass-ceramic material. The recrystallization heat treatment is furthermore advantageously controlled so as not to damage the layers underlying the solid electrolyte. It can be performed by an additional laser beam irradiation operation.

For example purposes, a porous lithiated ceramic material of 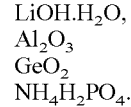 $Li_{1.5}Al_{0.5}Ge_{1.5}(PO_4)_3$ type also noted LAGP is produced from the following precursors:

$LiOH.H_2O$,
$Al_2O_3$,
$GeO_2$
$NH_4H_2PO_4$.

These precursors are weighed and mixed under stoichiometric conditions to prepare 3 grams of ceramic material. The mixture is then inserted in a platinum crucible and heat treated at 500° C. for 2 hours. The powder obtained is then dry crushed for 1 hour in a ball mill, with agate balls. The powder is then heat treated at 900° C. for 2 hours in a platinum crucible and is then crushed again under the same conditions as before.

Once it has been synthesized, the powdery ceramic material is shaped into layers. Three identical layers of LAGP were thus formed to measure their ionic conductivity to lithium ions, respectively before laser beam irradiation, after laser beam irradiation and after recrystallization heat treatment.

To form each layer, 1 g of synthesized powder is inserted into a mould with a thickness of 32 mm and pressed uniaxially under a pressure of 4 tonnes. The pellet obtained is then sintered at 950° C. for 2 hours and forms a layer of LAGP having a compactness of 85% and a thickness of 700 µm.

One of the three LAGP layers is arranged between two platinum electrodes to form a stack (a) whereas the other two LAGP layers are subjected to laser beam irradiation treatment to transform the LAGP into glass. The laser beam irradiation treatment is performed under the following conditions:
- pulse time: 30 ns
- wavelength: 248 nm
- frequency: between 1 and 45 Hz
- fluence: 450 mJ/cm$^2$
- number of pulses: between 1 and 10000
- atmosphere: primary vacuum One of the two layers subjected to the laser beam irradiation treatment is arranged between two platinum electrodes to form a stack (b).

The last layer is subjected to heat treatment at 875° C. for 12 hours to form the lithiated glass-ceramic material, before being placed between two platinum electrodes to form a stack (c).

Figure 12:
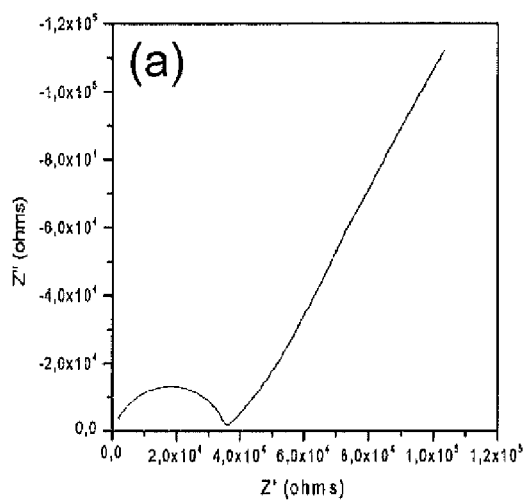
FIGS. 12 to 14 are graphs on which electrochemical impedance spectroscopy measurements are presented for a stack comprising a solid electrolyte made from LAGP arranged between two platinum electrodes, the solid electrolyte being a thin film obtained at 3 different stages in a production method according to the invention: before laser treatment, after laser treatment and after recrystallization heat treatment.
Figure 13:
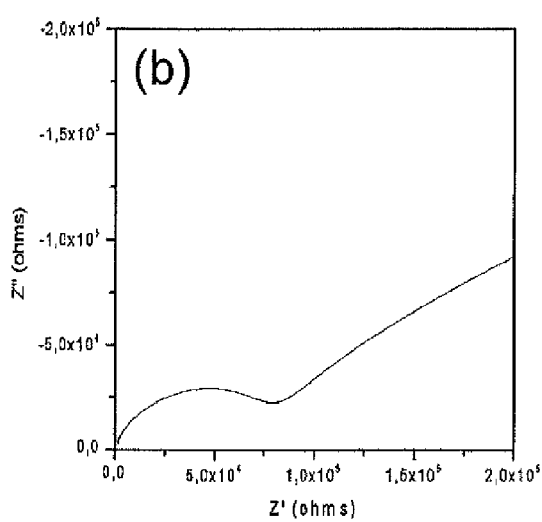
Figure 14:
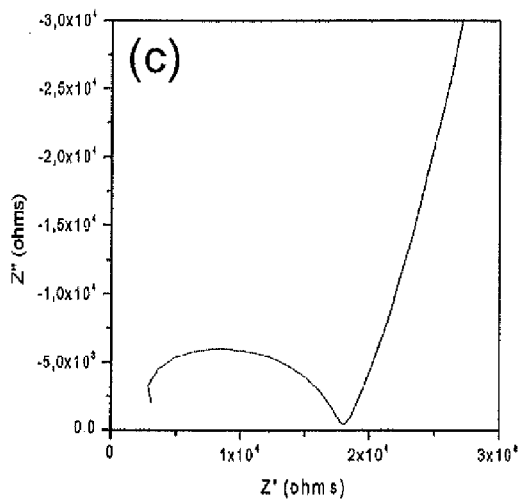

The electrochemical impedance spectroscopy measurements made at ambient temperature on these three stacks (a) to (c) are respectively given in FIGS. 12 to 14. The diameter of the semi-circle present on the graphs of FIGS. 12 to 14 is a factor representative of the total ionic conductivity of the electrolytic material of the stack involved.

It can be observed that the LAGP material treated by laser beam, before recrystallization heat treatment (stack b) present in FIG. 13, has a much more elongate semi-circle and therefore a larger diameter than before laser beam treatment (stack a—FIG. 12), which means a lower total ionic conductivity to lithium ions than the material before laser beam treatment (FIG. 12). This confirms the transformation from the ceramic material state to that of a much more resistive vitreous phase. Once the recrystallization heat treatment and therefore the transformation into lithiated glass-ceramic material (stack c) has been performed, the semi-circle of the graph in FIG. 14 is considerably smaller than that of the graph represented in FIG. 12, which means an increase of the total ionic conduction to lithium ions compared with the initial ceramic material.

The table below sets out the measurements of the total ionic conductivity for the 3 stacks.

| Stack | Total ionic conductivity (in S/cm) at ambient temperature |
| --- | --- |
| a | $1.5 * 10^{-5}$ |
| b | $5.0 * 10^{-6}$ |
| c | $2.9 * 10^{-5}$ |

The method proposed therefore presents the advantage of enabling a solid electrolyte to be produced comprising a part made from lithiated glass-ceramic material located in the space (laterally and/or vertically), compatible with the techniques used for producing the other components of a lithium battery, while at the same time preserving very good electrochemical performances. It further enables the stoichiometry of the material to be preserved in so far as very little $LiO_2$ evaporates with regard to the totality of the $Li^+$ ions present, compared with melting conventionally obtained above 1300° C. in a furnace.

The invention claimed is:

1. A method for producing a solid electrolyte for a lithium battery comprising at least one zone made from lithiated glass-ceramic material, wherein the lithiated glass-ceramic material zone is achieved by melting of at least a part of a lithiated ceramic material, performed by a laser beam irradiation operation and followed by a recrystallization heat treatment.

2. The method according to claim 1, wherein, before the laser beam irradiation operation, the lithiated ceramic material is in the form of a layer.

3. The method according to claim 2, wherein the layer presents a compactness comprised between 70% and 95% and advantageously between 85% and 95%.

4. The method according to claim 2, wherein the layer is a thin film.

5. The method according to claim 4, wherein the thin film is formed on a support, before the laser beam irradiation operation.

6. The method according to claim 5, wherein the support is a multilayer stack comprising at least one current collector and an electrode for a lithium battery.

7. The method according to claim 4, wherein the whole of the thin film is subjected to the laser beam irradiation operation.

8. The method according to claim 2, wherein the layer is a bulk substrate.

9. The method according to claim 8, wherein the bulk substrate is locally subjected to the laser beam irradiation operation, the part of the bulk substrate subjected to the laser beam irradiation operation forming the lithiated glass-ceramic material zone of the solid electrolyte, after the recrystallization heat treatment.

10. The method according to claim 1, wherein the laser beam is a pulsed laser beam.

11. The method according to claim 1, wherein the recrystallization heat treatment is performed in a furnace at a lower temperature than the melting temperature of the lithiated ceramic material, for a time comprised between 1 hour and 72 hours.

12. The method according to claim 1, wherein the recrystallization heat treatment is performed by an additional laser beam irradiation operation.

13. A solid electrolyte for a lithium battery produced by the method of claim 1, comprising at least one lithiated glass-ceramic material zone, and at least one additional zone constituted by grains of lithiated ceramic material coated by the lithiated glass-ceramic material, said additional zone being in contact with the lithiated glass-ceramic material zone.

* * * * *